(12) United States Patent
Jalaldeen et al.

(10) Patent No.: US 8,775,615 B2
(45) Date of Patent: Jul. 8, 2014

(54) SNMP-BASED MANAGEMENT OF SERVICE ORIENTED ARCHITECTURE ENVIRONMENTS

(75) Inventors: Ahamed Jalaldeen, Karnataka (IN); Siddharth N. Purohit, Allen, TX (US); Gandhi Sivakumar, Bentleigh (AU); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/415,818

(22) Filed: Mar. 8, 2012

(65) Prior Publication Data
US 2013/0238781 A1 Sep. 12, 2013

(51) Int. Cl.
*G06F 15/173* (2006.01)
(52) U.S. Cl.
USPC .......................... 709/224; 709/204
(58) Field of Classification Search
None
See application file for complete search history.

(56) References Cited

U.S. PATENT DOCUMENTS

| | | | |
|---|---|---|---|
| 2006/0242284 A1 | 10/2006 | Savage | |
| 2009/0182849 A1 | 7/2009 | Inamdar et al. | |
| 2010/0229096 A1* | 9/2010 | Maiocco et al. | 715/734 |
| 2010/0262695 A1* | 10/2010 | Mays et al. | 709/226 |
| 2012/0198037 A1* | 8/2012 | Shelby et al. | 709/223 |

FOREIGN PATENT DOCUMENTS

| | | | |
|---|---|---|---|
| RU | 2378784 C2 | 10/2010 | |
| WO | WO2009083893 A2 | 7/2009 | |

OTHER PUBLICATIONS

K. Tesink, Editor, Network Working, "Textual Conventions for MIB Modules Using Performance History Based on 15 Minute Intervals", Request for Comments: 2493, Bellcore Category: Standards Track Jan. 1999, all Pages, Retrieved from the Internet:<http://www.rfc-editor.org/rfc/rfc2493.txt>.
E.A. Smith, "Engineering the network for applications and services", [retrieved on Aug. 3, 2011]. Retrieved from the Internet:<http://www.btplc.com/Innovation/Journal/BTTJ/current/HTMLArticles/Volume26/02Engineering>, all pages.
Steve Linn et al., "Monitoring WebSphere DataPower SOA Appliances", Mar. 24, 2010, Retrieved from the Internet<http://www.ibm.com/developerworks/websphere/library/techarticles/1003_rasmussen/1003_rasmussen.html>, all pages.
OASIS Web Services Distributed Management: Management of Web Services (WSDM-MOWS) 1.1 OASIS Standard, Aug. 1, 2006, [retrieved Aug. 18, 2011]. Retrieved from the Internet: <http://docs.oasis-open.org/wsdm/wsdm-mows-1.1-spec-os-01.pdf>, all pages.

(Continued)

*Primary Examiner* — Ario Etienne
*Assistant Examiner* — Clayton R Williams
(74) *Attorney, Agent, or Firm* — Law Office of Ira D. Blecker, P.C.

(57) ABSTRACT

A Simple Network Management Protocol (SNMP)-based apparatus including an SNMP manager to monitor network hardware devices and define object identifiers (OIDs); a Simple SOA Performance Monitor (SSPM) manager to augment the OIDs with service-specific object identifiers to monitor services; and an SSPM agent associated with at least one service to collect details pertaining to the service, the details of the service being provided to the SSPM manager which in turn provides the details of the service to the SNMP manager. The SNMP-based apparatus may be implemented by at least one computing device. Also disclosed is a method of monitoring services and a computer program product.

17 Claims, 4 Drawing Sheets

(56) References Cited

OTHER PUBLICATIONS

Bob Natale, "Development of a Standard Methodology for Converting SNMP MIBs to Resource Models for the SOA/Web Services Management Environment (MIB2RMDL)", Mar. 21, 2007. Retrieved from the Internet:<http://www.ietf.org/proceedings/68/slides/opsarea-7/opsarea-7.ppt>, all pages.

"SOA changing management, monitoring". [retrieved Aug. 3, 2011]. Retrieved from the Internet:< http://searchsoa.techtarget.com/news/1285040/SOA-changing-management-monitoring>, all pages.

IBM WebSphere DataPower SOA Appliances, Aug. 24, 2011. Retrieved from the Internet:<http://esbsupport.org/doc/soa-appliance-datasheet>, all pages.

K. Kotsiopoulos et al., "A SOA-Based Information Management Model for Next-Generation.Network", Proceedings of the International Conference on Computer and Communication Engineering 2008, May 13-15, 2008, all pages.

Zhihui Lu et al., "SOAMS: A Novel SOA-Based System and Network Management Model and Scheme", 2008 IEEE International Conference on Services Computing, Jul. 7-11, 2008, all pages.

\* cited by examiner

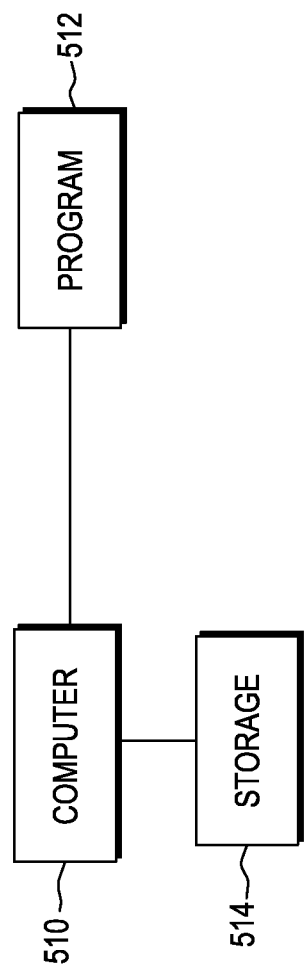

SNMP-BASED MANAGEMENT OF SERVICE ORIENTED ARCHITECTURE ENVIRONMENTS

BACKGROUND

The present exemplary embodiments are related to monitoring of services and, more particularly, are related to monitoring of services in a service oriented architecture environment.

Network equipment (hardware devices) may be traditionally monitored by Simple Network Management Protocol (SNMP). SNMP monitoring may include an SNMP agent and an SNMP manager. The SNMP agent runs in the network elements. Data describing the network equipment, such as number of packets received in a particular link, is collected in a virtual data base called a Management Information Base (MIB). The SNMP manager polls the SNMP agents and collects the data in its data base.

Service Oriented Architecture (SOA) is a set of principles and methodologies for designing and developing software in the form of interoperable services. These services are well-defined business functionalities that are built as software components (discrete pieces of code and/or data structures) that can be reused for different purposes.

Various proposals have been offered to monitor SOA-based services but these tend to be event-based monitoring methods which require new standards to implement.

BRIEF SUMMARY

The various advantages and purposes of the exemplary embodiments as described above and hereafter are achieved by providing, according to a first aspect of the exemplary embodiments, a Simple Network Management Protocol (SNMP)-based apparatus including an SNMP manager to monitor network hardware devices and define object identifiers (OIDs); a Simple SOA Performance Monitor (SSPM) manager to augment the OIDs with service-specific object identifiers to monitor services; and an SSPM agent associated with at least one service to collect details pertaining to the service, the details of the service being provided to the SSPM manager which in turn provides the details of the service to the SNMP manager; wherein the SNMP-based apparatus is implemented by at least one computing device.

According to a second aspect of the exemplary embodiments, there is provided a method of monitoring services including providing a Simple Network Management Protocol (SNMP)-based apparatus comprising an SNMP manager, a Simple SOA Performance Monitor (SSPM) manager and an SSPM agent: monitoring network hardware devices and defining object identifiers (OIDs) by the SNMP manager; augmenting by the SSPM manager the OIDs with service-specific object identifiers to monitor SOA-based services; associating the SSPM agent with at least one service and collecting details pertaining to the service; providing by the SSPM agent the details of the service to the SSPM manager; and providing by the SSPM manager the details of the service to the SNMP manager; the method being implemented by at least one computing device.

According to a third aspect of the exemplary embodiments, there is provided a computer program product for monitoring services, the computer program product including a computer readable storage medium having computer readable program code embodied therewith. The computer readable program code including computer readable program code configured to provide a Simple Network Management Protocol (SNMP)-based apparatus comprising an SNMP manager, a Simple SOA Performance Monitor (SSPM) manager and an SSPM agent: computer readable program code configured to monitor network hardware devices and define object identifiers (OIDs) by the SNMP manager; computer readable program code configured to augment by the SSPM manager the OIDs with service-specific object identifiers to monitor SOA-based services; computer readable program code configured to associate the SSPM agent with at least one service and collect details pertaining to the service; computer readable program code configured to provide by the SSPM agent the details of the service to the SSPM manager; and computer readable program code configured to provide by the SSPM manager the details of the service to the SNMP manager.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 5 is a block diagram of a computing device for implementing the exemplary embodiments.

DETAILED DESCRIPTION

The exemplary embodiments pertain to a solution in which the SNMP protocol used for network equipment monitoring may be extended to monitor the service components in an SOA environment.

In the exemplary embodiments, an SNMP apparatus may include an SNMP manager to monitor network hardware devices and define object identifiers (OIDs) with respect to the devices, a Simple SOA Performance Monitor (SSPM) manager (SSPMM) to augment the device OIDs with service-specific OIDs to monitor services, and an SSPM agent (SSPMA) associated with at least one service to collect details pertaining to the service. The details of the service are provided to the SSPM manager which in turn provides the details of the service to the SNMP manager. The SNMP-based apparatus may be implemented by one or more computing devices.

Figure 1:
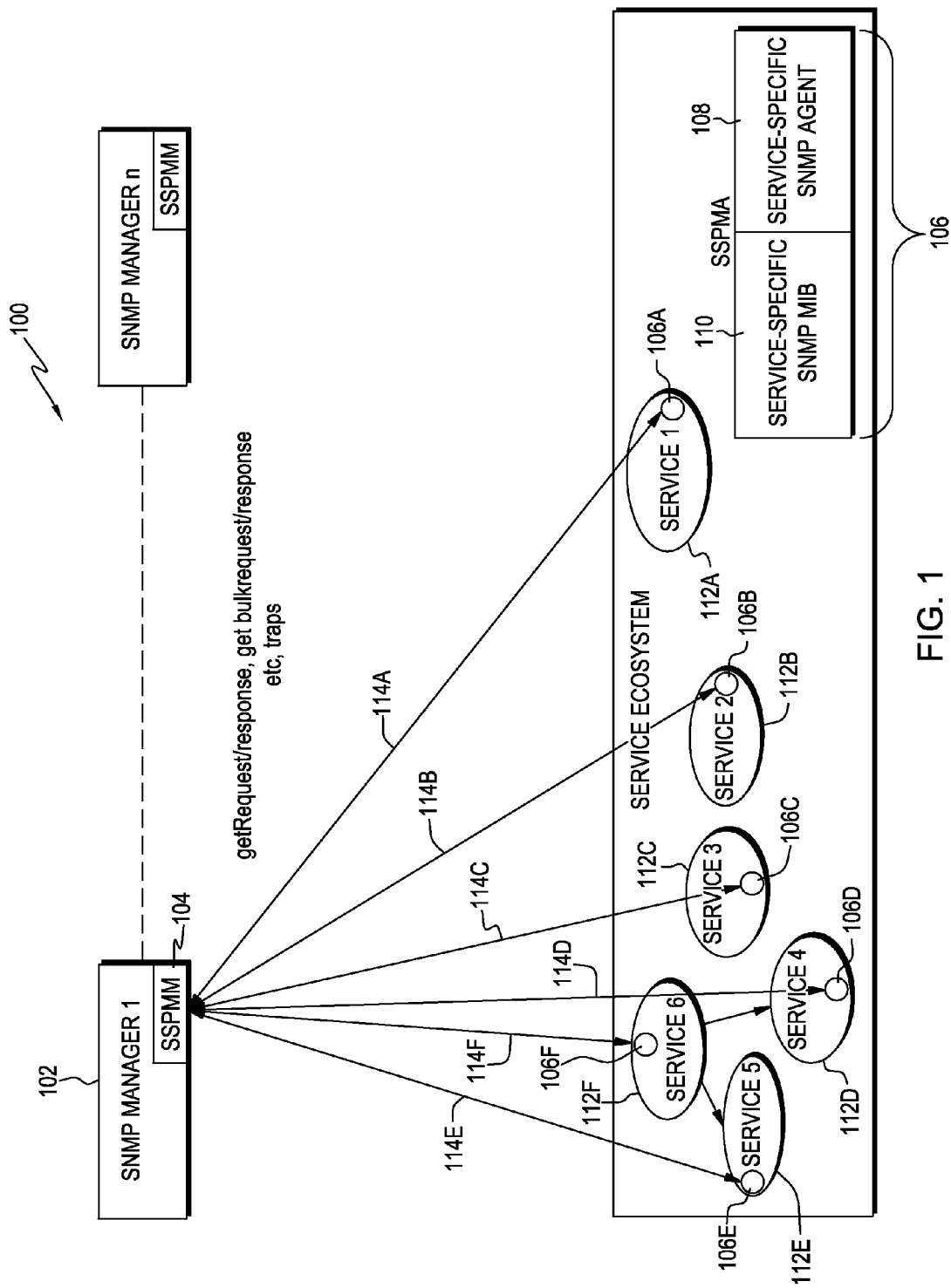
FIG. 1 is a schematic representation of a first exemplary embodiment of an SNMP-based apparatus for monitoring services.

Referring to the Figures in more detail, FIG. 1 illustrates a first exemplary embodiment of an SNMP-based apparatus 100. The apparatus 100 includes one or more traditional SNMP managers 102. The SNMP manager 102 includes an SSPM manager 104 when monitoring SOA-based environments. The SSPM manager 104 may reside within SNMP manager 102 or be remotely connected to the SNMP manager 104. The SSPM manager 104 provides added functionality to the SNMP manager 102 so that services, such as SOA-based services, may be monitored by the SNMP manager 102. Connected to SSPM manager 104 is one or more SSPM agents 106. Each SSPM agent 106 may include two parts: a service-specific SNMP agent 108 and a service-specific SNMP management information base (MIB) 110. As shown in FIG. 1, there are 6 SSPM agents 106A-F. Each SSPM agent 106A-F may be connected to at least one service 112A-F.

An OID names an object in an MIB and specifies statistics of a parameter. The MIB for the exemplary embodiment describes the management data of a service and uses a hierarchical namespace containing OIDs. Each OID identifies a variable that can be read or set via SNMP through the SSPM manager 104.

The SNMP Manager 102 is an overarching entity that resides in applications in the upper tier, for example the application layer of the internet protocol suite. In a traditional environment, the SNMP Manager 102 may poll the SNMP agents based upon the polling period set and collects the data in its data base. Through this data, both historic and online reports may be generated and appropriate alarms can be raised in case of traffic congestion, link failures etc. SNMP also allows configuring the SNMP agents for sending traps—for faster processing of the critical details by the manager.

Figure 3:
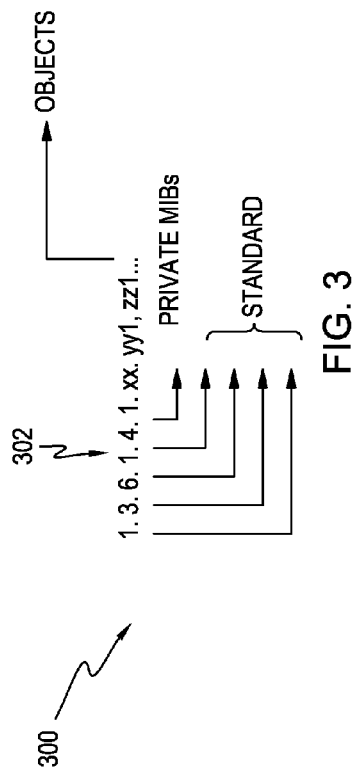
FIG. 3 is an illustration of an object identifier for a hardware device.
Figure 4:
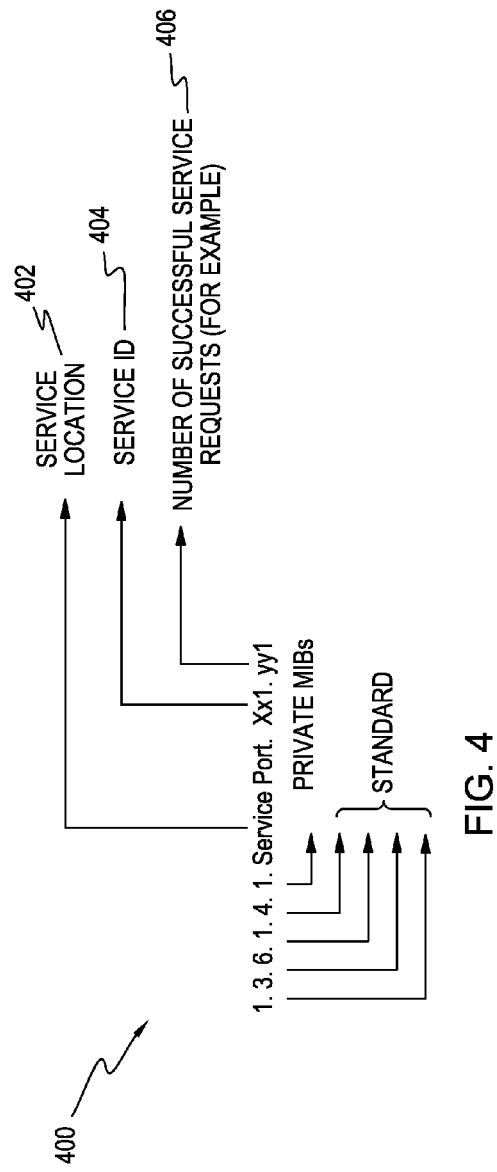
FIG. 4 is an illustration of an object identifier for a service.

In the exemplary embodiments, the traditional SNMP agents have been replaced by SSPM agents 106A-F. The SSPM agents 106A-F may collect the details of its associated service 112A-F, respectively, and in turn will be polled by the SSPM manager 104 at predetermined intervals. The SSPM manager 104 augments the OIDs with service-specific identifiers. FIG. 3 is an illustration of an OID 300 for a hardware device. OID 300 is limited to identifiers 302 for hardware devices. Referring now to FIG. 4, there is an illustration of an OID 400 for a service which may include, for example, a service location 402 and a service identification 404. Other information related to the service may include, for example, the number of successful service requests 406. The OID 400 enables the monitoring of services in an SOA-based environment as the OID 400 serves as an identifier for every metric on which statistics have to be collected for the service.

As noted above, each SSPM agent 106A-F includes a service-specific SNMP agent 108 and a service-specific SNMP management information base (MIB) 110. The service-specific SNMP agent 108 collects the details of its associated service 112A-F and stores the details in the service-specific SNMP MIB 110. These details may be provided to the SSPM manager 104 by the SSPM agent 106A-F when polled by the SSPM manager 104 on a periodic basis. The OID 400 in the service-specific SNMP MIB 110 identifies a service parameter or attribute for every SOA component so that the SSPM agent 106A-F is polled for the interested OID 400. The service-specific SNMP agent 108 returns the value related to that OID 400 to the SSPM manager 104 or sends traps for that OID 400 when the threshold is crossed.

The SSPM manager 104 polls the SSPM agents 106A-F and the SSPM agents 106A-F intercept requests and responses to/from the services and these requests and responses 114A-F are provided to the SSPM manager 104. These requests/responses may be similar to the GetRequest, GetNextRequest, GetBulkRequest, etc. requests/responses typically found in SNMP-based systems but these requests/responses are directed to services in the exemplary embodiments. The SSPM manager 104 asks the SSPM agents 106A-F for details or statistics of specific service aspects such as how many requests failed or succeeded. The responses may be the values enumerating the requests that failed or succeeded.

In this first exemplary embodiment, each SSPM agent 106A-F will have a disintegrated architecture where every service 112A-F may have one SSPM agent 106A-F which is either co-located within the service node or deployed in a different node. As shown in FIG. 1, each SSPM agent 106A-F is located in the respective service node 112A-F. Such a disintegrated architecture has advantages in that it is easy to sunset a specific service. Maintenance may be costly because there are an equal number of agents as the number of services.

Figure 2:
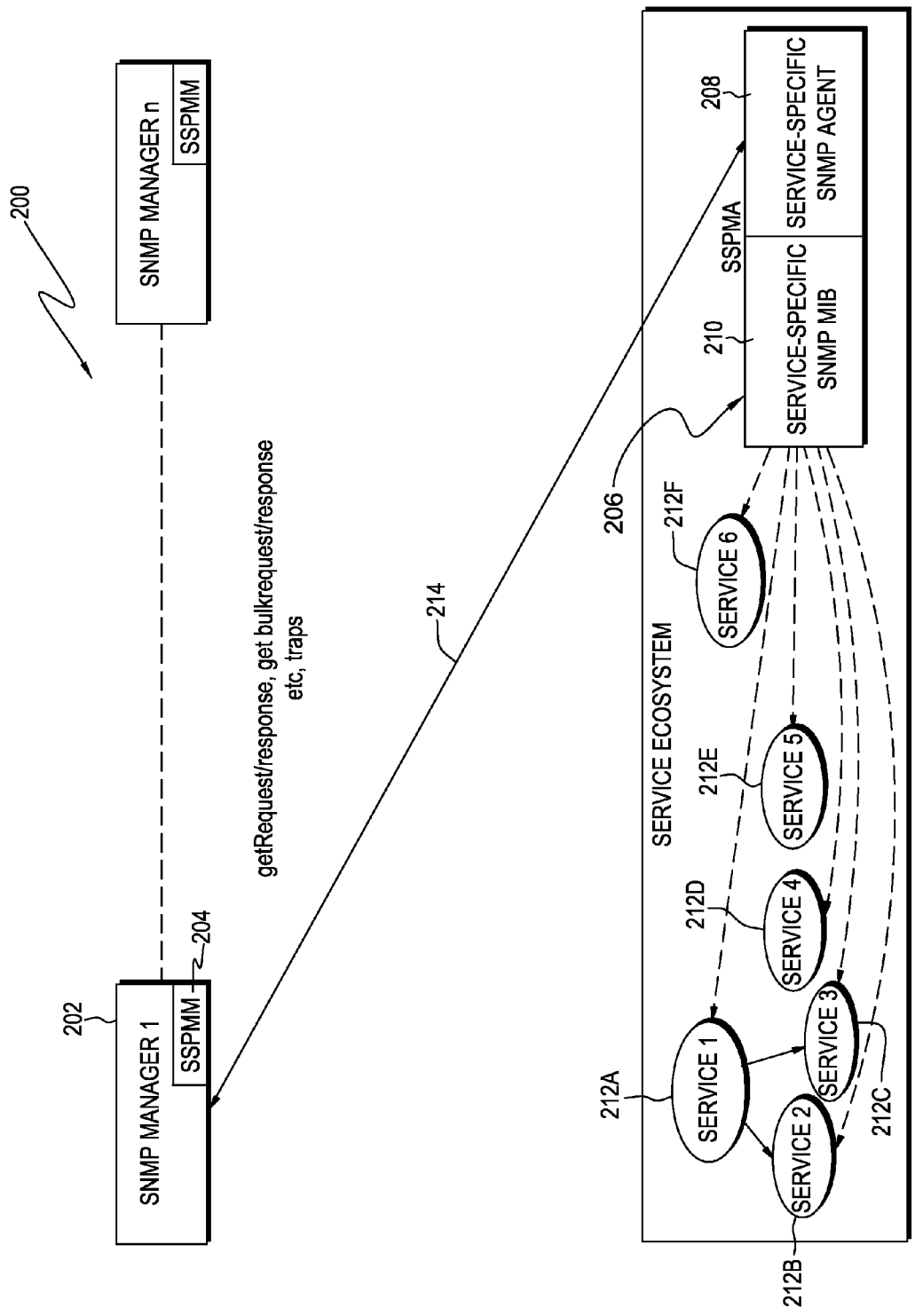
FIG. 2 is a schematic representation of a second exemplary embodiment of an SNMP-based apparatus for monitoring services.

Referring now to FIG. 2, there is illustrated a second exemplary embodiment of an SNMP-based apparatus 200. The apparatus 200 includes one or more traditional SNMP managers 202. The SNMP manager 202 may also include an SSPM manager 204. The SSPM manager 204 may reside within SNMP manager 202 or be remotely connected to the SNMP manager 204. Connected to SSPM manager 204 (SSPMM) is one or more SSPM agents 206. As shown in FIG. 2, there is one SSPM agent 206. The SSPM agent 206 (SSPMA) may include two parts: a service-specific SNMP agent 208 and a service-specific SNMP management information base (MIB) 210. The SSPM agent 206 may be connected to a plurality of services 212A-F.

The apparatus 200 works similarly to apparatus 100 in that the service-specific SNMP agent 208 collects the details of its associated services 212A-F and stores the details in the service-specific SNMP MIB 210. These details may be provided to the SSPM manager 204 by the SSPM agent 206 when polled by the SSPM manager 204 on a periodic basis. The SSPM manager 204 polls the SSPM agent 206 and the SSPM agent 206 intercepts requests and responses to/from the services and these requests and responses 214 are provided to the SSPM manager 204.

Apparatus 100 and apparatus 200 differ in that in apparatus 200 of the second exemplary embodiment, a single SSPM agent 206 exists for many services 212A-F and collects the details of the services 212A-F. Because a single agent manages n services, any addition or removal of a service may require change in the agent and is complex. Maintenance is easier however.

The computing devices implementing the SNMP-based apparatus may be a general-purpose computer or a special purpose device such as a hand-held computer. FIG. 5 is a block diagram that illustrates one exemplary hardware environment of the computing devices. The exemplary embodiments may be implemented using a computer 510 comprised of microprocessor means, random access memory (RAM), read-only memory (ROM) and other components. The computer 510 may be a personal computer, server, mainframe computer, hand-held device or other computing device. Resident in the computer 510, or peripheral to it, may be a storage device 514 of some type such as a hard disk drive, floppy disk drive, CD-ROM drive, tape drive or other storage device.

Generally speaking, the software implementation of the exemplary embodiments, program 512 in FIG. 5, may be tangibly embodied in a computer-readable medium such as one of the storage devices 514 mentioned above. The program 512 may comprise instructions which, when read and executed by the microprocessor of the computer 510, may cause the computer 510 to perform the steps necessary to execute the steps or elements of the exemplary embodiments.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A Simple Network Management Protocol (SNMP)-based apparatus comprising:
   an SNMP manager to monitor network hardware devices and define object identifiers (OIDs);
   a Simple SOA Performance Monitor (SSPM) manager to augment the OIDs with service-specific object identifiers to monitor at least one service within an SOA environment and to provide added functionality to the SNMP manager so that the SNMP manager can monitor the at least one service and in addition monitor the network hardware devices and define the OIDs;
   an SSPM agent associated with the at least one service to collect details pertaining to the at least one service, the details of the at least one service being provided to the SSPM manager, wherein the SSPM manager periodically polls the SSPM agent for the details specified in the augmented OID pertaining to the at least one service, and wherein the SSPM manager in turn provides the details of the at least one service to the SNMP manager; and wherein the SNMP-based apparatus is implemented by at least one computing device comprising a processor and a memory.

2. The SNMP-based apparatus of claim 1 wherein there are a plurality of services and there is one SSPM agent for each service of the plurality of services.

3. The SNMP-based apparatus of claim 1 wherein there are a plurality of services and there is one SSPM agent for the plurality of services.

4. The SNMP-apparatus of claim 1 wherein the SSPM Agent is capable of sending SOA-based traps to the SSPM Manager.

5. The SNMP-based apparatus of claim 1 further comprising a service-specific management information base (MIB) and service-specific SNMP agent associated with each SSPM agent, the service-specific SNMP agent to collect the details of the at least one service associated with the SSPM agent and store the details of the at least one service in the MIB.

6. The SNMP-based apparatus of claim 1 wherein the OID has fields for service port, service location and the identification of the at least one service.

7. The SNMP-based apparatus of claim 1 wherein there are a plurality of services and each OID identifies a service parameter or attribute for each service of the plurality of services so that the SSPM agent is periodically polled for the correct service.

8. A method of monitoring services comprising:
providing a Simple Network Management Protocol (SNMP)-based apparatus comprising an SNMP manager, a Simple SOA Performance Monitor (SSPM) manager and an SSPM agent;
monitoring network hardware devices and defining object identifiers (OIDs) by the SNMP manager;
augmenting by the SSPM manager the OIDs with service-specific object identifiers to monitor at least one service in an SOA environment and providing added functionality by the SSPM manager to the SNMP manager so that the SNMP manager is monitoring the at least one service and in addition monitoring the network hardware devices and defining the OIDs;
associating the SSPM agent with the at least one service and collecting details pertaining to the at least one service;
providing by the SSPM agent the details of the at least one service to the SSPM manager by periodically polling by the SSPM manager the SSPM agent for the details specified in the augmented OIDs pertaining to the at least one service;
providing by the SSPM manager the details of the at least one service to the SNMP manager; and
the method being implemented by at least one computing device comprising a processor and a memory.

9. The method of claim 8 wherein there are a plurality of services and associating includes associating one SSPM agent with each service of the plurality of services and collecting details pertaining to each service of the plurality of services.

10. The method of claim 8 wherein there are a plurality of services and associating includes associating one SSPM agent for the plurality of services and collecting details pertaining to the plurality of services.

11. The method of claim 8 wherein the SNMP-based apparatus further comprising a service-specific management information base (MIB) and service-specific SNMP agent associated with each SSPM agent, the service-specific SNMP collecting the details of the at least one service associated with the SSPM agent, and further comprising storing by the MIB the details about the at least one service associated with the SSPM agent.

12. The method of claim 8 wherein the OID has fields for service port, service location and the identification of the at least one service.

13. A computer program product for monitoring services, the computer program product comprising:
a non-transitory computer readable storage medium having computer readable program code embodied therewith, the computer readable program code comprising:
computer readable program code configured to provide a Simple Network Management Protocol (SNMP)-based apparatus comprising an SNMP manager, a Simple SOA Performance Monitor (SSPM) manager and an SSPM agent;
computer readable program code configured to monitor network hardware devices and define object identifiers (OIDs) by the SNMP manager;
computer readable program code configured to augment by the SSPM manager the OIDs with service-specific object identifiers to monitor at least one service in an SOA environment and to provide added functionality by the SSPM manager to the SNMP manager so that the SNMP manager can monitor the at least one service and in addition monitor the network hardware devices and define the OIDs;
computer readable program code configured to associate the SSPM agent with the at least one service and collect details pertaining to the at least one service;
computer readable program code configured to provide by the SSPM agent the details of the at least one service to the SSPM manager, wherein the SSPM manager periodically polls the SSPM agent for the details specified in the augmented OIDs pertaining to the at least one service; and
computer readable program code configured to provide by the SSPM manager the details of the at least one service to the SNMP manager.

14. The computer program product of claim 13 wherein there are a plurality of services and wherein computer readable program code configured to associate includes computer readable program code configured to associate one SSPM agent with each service of the plurality of services and collect details pertaining to each service of the plurality of services.

15. The computer program product of claim 13 wherein there are a plurality of services and wherein computer readable program code configured to associate includes computer readable program code configured to associate one SSPM agent for the plurality of services and collect details pertaining to the plurality of services.

16. The computer program product of claim 13 wherein the SNMP-based apparatus further comprising a service-specific management information base (MIB) and service-specific SNMP agent associated with each SSPM agent, the service-specific SNMP collecting the details of the at least one service associated with the SSPM agent and further comprising computer readable program code configured to store by the MIB the details about the at least one service associated with the SSPM agent.

17. The computer program product of claim 13 wherein the OID has fields for service port, service location and the identification of the at least one service.

* * * * *